United States Patent
Dronzek, Jr.

(10) Patent No.: US 7,579,061 B2
(45) Date of Patent: Aug. 25, 2009

(54) COLOR CHANGING TAPE, LABEL, CARD AND GAME INTERMEDIATES

(75) Inventor: Peter J. Dronzek, Jr., Thornwood, NY (US)

(73) Assignee: Polymeric Converting LLC, Enfield, CT (US)

( * ) Notice: Subject to any disclaimer, the term of this patent is extended or adjusted under 35 U.S.C. 154(b) by 656 days.

(21) Appl. No.: 11/091,535

(22) Filed: Mar. 28, 2005

(65) Prior Publication Data

US 2005/0258634 A1   Nov. 24, 2005

Related U.S. Application Data

(63) Continuation-in-part of application No. PCT/US03/30667, filed on Sep. 29, 2003.

(60) Provisional application No. 60/415,250, filed on Sep. 30, 2002.

(51) Int. Cl.
*B32B 9/00* (2006.01)
*B32B 33/00* (2006.01)

(52) U.S. Cl. .................. 428/42.1; 428/41.6; 428/40.1; 428/41.8; 428/913; 428/916; 206/807; 383/5

(58) Field of Classification Search ............... 206/807; 428/41.6, 40.1, 41.8, 42.1, 913, 916; 220/DIG. 34; 383/5

See application file for complete search history.

(56) References Cited

U.S. PATENT DOCUMENTS

| | | |
|---|---|---|
| 3,935,960 A | 2/1976 | Cornell |
| 4,180,929 A | 1/1980 | Schultz |
| 4,829,641 A | 5/1989 | Williams |
| 4,837,061 A | 6/1989 | Smits et al. |
| 4,927,036 A | 5/1990 | Diehl Pojedinec |
| 4,994,314 A | 2/1991 | Rosenfeld et al. |
| 5,005,719 A | 4/1991 | Phillips et al. |
| 5,062,928 A | 11/1991 | Smith |
| 5,082,702 A | 1/1992 | Alband |
| 5,135,262 A | 8/1992 | Smith et al. |
| 5,137,208 A * | 8/1992 | Wang et al. ............. 229/102 |
| 5,149,386 A | 9/1992 | Smits et al. |
| 5,219,194 A | 6/1993 | Trent et al. |
| 5,224,221 A | 7/1993 | Richardson et al. |
| 5,282,650 A | 2/1994 | Smith et al. |
| 5,292,018 A | 3/1994 | Travisano |
| 5,298,104 A | 3/1994 | Absher |
| 5,413,234 A | 5/1995 | Hekal et al. |

(Continued)

FOREIGN PATENT DOCUMENTS

EP   0555972 A1 *   8/1993

(Continued)

OTHER PUBLICATIONS

PCT Search Report Dated Feb. 18, 2004.

*Primary Examiner*—Michael C Miggins
(74) *Attorney, Agent, or Firm*—Hedman & Costigan, P.C.

(57) ABSTRACT

This invention relates to color changing tape, label, card and game intermediates for evidence of use, concealing proprietary information or gaming or promotional information until the intermediate is separated. The intermediate includes a substrate of clear or transparent or colored translucent polymeric film or translucent paper combined with judiciously selected cleanly separable translucent colored coatings in intimate contact to form one translucent color that leave no residue when separated.

10 Claims, 4 Drawing Sheets

U.S. PATENT DOCUMENTS

| | | |
|---|---|---|
| 5,417,790 A | 5/1995 | Petrou |
| 5,436,073 A | 7/1995 | Williams et al. |
| 5,492,411 A | 2/1996 | May |
| 5,524,294 A | 6/1996 | Richardson et al. |
| 5,544,770 A | 8/1996 | Travisano |
| 5,551,729 A | 9/1996 | Morgan |
| 5,581,978 A | 12/1996 | Hekal et al. |
| 5,582,887 A | 12/1996 | Etheredge |
| 5,595,590 A | 1/1997 | Belding et al. |
| 5,604,000 A | 2/1997 | May |
| 5,605,230 A | 2/1997 | Marino, Jr. et al. |
| 5,628,858 A | 5/1997 | Petrou |
| 5,651,846 A | 7/1997 | Hurst |
| 5,719,828 A | 2/1998 | Haas et al. |
| 5,733,636 A | 3/1998 | May |
| 5,767,184 A | 6/1998 | May |
| 5,779,137 A | 7/1998 | Coffey |
| 5,786,509 A | 7/1998 | Belding et al. |
| 5,829,789 A | 11/1998 | Treleaven et al. |
| 5,855,722 A | 1/1999 | Osaka |
| 5,862,101 A | 1/1999 | Haas et al. |
| 6,000,726 A | 12/1999 | Campbell |
| 6,004,656 A | 12/1999 | Gosselin et al. |
| 6,035,568 A | 3/2000 | Grosskopf et al. |
| 6,051,311 A | 4/2000 | Osaka |
| 6,087,075 A | 7/2000 | Kler |
| 6,114,281 A | 9/2000 | Belding et al. |
| 6,117,264 A | 9/2000 | Brewster |
| 6,170,879 B1 | 1/2001 | Rawlings |
| RE37,164 E | 5/2001 | Petrou |
| 6,254,138 B1 | 7/2001 | Rawlings et al. |
| 6,264,033 B1 | 7/2001 | Kannabiran et al. |
| 6,281,795 B1 | 8/2001 | Smith et al. |
| 6,379,761 B1 | 4/2002 | Brandt et al. |
| 6,403,185 B1 | 6/2002 | Neuburger et al. |
| 6,420,006 B1 | 7/2002 | Scott |
| 6,447,015 B1 | 9/2002 | Linnewiel |
| 6,471,058 B2 | 10/2002 | Kannabiran et al. |
| 6,519,885 B2 | 2/2003 | Valiulis |
| 6,613,430 B2 | 9/2003 | Culbertson et al. |
| 2001/0022280 A1 | 9/2001 | Kannabiran et al. |
| 2002/0142121 A1 | 10/2002 | Hingsen-Gehrmann et al. |
| 2002/0170465 A1 | 11/2002 | Scholz et al. |
| 2003/0012911 A1 | 1/2003 | Campbell |
| 2003/0039785 A1 | 2/2003 | Dronzek |
| 2003/0052032 A1 | 3/2003 | Dickinson et al. |
| 2003/0052786 A1 | 3/2003 | Dickinson et al. |
| 2003/0059565 A1 | 3/2003 | Otaki et al. |
| 2003/0141976 A1 | 7/2003 | Dickinson et al. |
| 2003/0145945 A1 | 8/2003 | Kennedy |
| 2003/0175508 A1 | 9/2003 | Franko |
| 2003/0175509 A1 | 9/2003 | Franko |

FOREIGN PATENT DOCUMENTS

| | | |
|---|---|---|
| GB | 2 243 578 A | 11/1991 |
| WO | WO 96/40395 | 12/1996 |

* cited by examiner

COLOR CHANGING TAPE, LABEL, CARD AND GAME INTERMEDIATES

This application is a continuation-in-part of PCT Application Serial No. PCT/US03/30667, filed Sep. 29, 2003 which claims the priority of Provisional Application Ser. No. 60/415,250, filed Sep. 30, 2002.

FIELD OF THE INVENTION

This invention relates to tape, label, card and game intermediates for evidence of use, concealing proprietary or gaming or promotional information until the intermediate is separated. The intermediate includes a substrate of clear or colored transparent or translucent polymeric film or translucent paper with one side coated with at least one judiciously selected cleanly separable translucent tinted coating(s) in intimate contact to form one translucent color that leave no residue when separated. Indicia of a different color not meant to be masked or hidden applied to either side of the combined translucent layer is visible. The coated layers when separated split into two different colored layers effecting a color change to show evidence of use. Optionally, in a preferred embodiment, the invention is useful for masking printed indicia until the intermediate is used such as for gaming pieces or for masking confidential information such as credit card Pin numbers and the like. To accomplish this, indicia can be applied by the converter or printer to the exposed surface of the intermediate or can be printed on an article with the intermediate affixed over the indicia. The indicia color or tint is selected to be the same color or one dominated by the color combination of the colored translucent layers in intimate contact so that it is invisible to the eye until the layers of the intermediate are separated. The indicia can be customized by conventional flexographic, gravure or lithographic techniques or by electronic imaging techniques including but not limited to ink jet, thermal transfer, laser, direct thermal, dye diffusion thermal transfer and other toner and variable information printing technologies instead of purchasing pre-patterned materials from substrate suppliers.

BACKGROUND OF THE INVENTION

Skov, U.S. Pat. No. 5,582,434 describes a two component permanent tamper resistant protective film label which after application will damage the underlying label upon removal. The first component is a patterned layer with substantially no adhesion to the second component, a transparent base film with a continuous coated layer applied over the pattern layer with strong adhesion to the transparent film. Both coatings have indices of refraction that render the continuous coating and pattern layer indiscernible with respect to one another. An adhesive layer is applied to the continuous coating. A portion of the protective film has substantially no adhesion to the patterned layer and strong adhesion to areas outside the pattern layer to allow the protective film to readily separate from and destruct portions of the pattern layer when the film is removed. This structure is used for tamper evident applications where a pattern layer and a coated layer preferably of the same material is assembled by the label substrate manufacturer. It is not universally acceptable because there is no customization possible in terms of the tamper evident pattern or indicia. It can only be used for tamper evident applications and has no provision to mask confidential information in non-tamper evident applications.

Schaefer, U.S. Pat. No. 4,557,505, describes stress-opacifying tamper indicating tape for closures which bears a visible message which is changed when the tape is subjected to stress to indicate that it has been tampered with. The message change occurs by the tape becoming opaque to conceal one message and provide a contrasting background for a different message. The invention comprises a stress opacifying translucent polymeric backing having an exposed surface with printed indicia of a translucent colored ink material and contrasting colored indicia on the opposite surface of the backing layer. A coating in the background area of the contrasting indicia is applied on the opposite surface with the color of the coating substantially the same as the color of the indicia on the exposed surface. The contrasting indicia of the contrasting color is visible from the exposed side of said backing until the backing is subjected to sufficient stress to opacify said backing obliterating the contrasting indicia and background coating to create the visibility of the indicia on the exposed surface. This product is not universally accepted because by becoming opaque, information below the tape is no longer is visible versus the two clear or translucent separable layers of the current invention. Additionally, the choice of stress opacifying tapes for commercial use are limited and expensive versus the current invention where any clear or transparent polymeric material or translucent paper can be used.

Ewan, U.S. Pat. No. 5,294,470, describes tamper evident seals comprising a transparent or translucent substrate sheet having and outer surface and an inner surface with a layer of adhesive on the inner surface. Disposed between the layer of adhesive and the inner surface of the substrate is a tamper indicating means comprising a transparent masking material disposed on the inner surface in a indicia defining pattern and a layer of colorant extending beyond the indicia defining pattern of the masking material. Where present, the masking material reduces the strength of the bond between the colorant and substrate sheet to below the strength of the bond between the colorant and the adhesive. Upon attempted removal of the seal from a surface to which it has been applied, the colorant comes off the substrate sheet in the area of the masking material to create a permanent but previously nonevident tamper indicating indicia visible through the substrate sheet. The outline of the indicia corresponds to the area of the masking material. This invention as in Skov uses a pattern of indicia and coating, colored in this case which splits and leaves a residue on the substrate layer and article that it is affixed to.

Williams, U.S. Pat. No. 4,082,873 discloses switch proof labels comprising a transparent plastic film on which an indicia is printed in reverse and is then overcoated with an adhesive. The printing has a greater affinity for the adhesive than for the plastic film so that when the label is applied to an object and then removed, a tamper-indicating amount of the indicia remains on the object. This technology with the indicia visible at all times does not allow for graphics under the label to be clearly read at any time and is the most basic form of a tamper evident label.

Bachman, U.S. Pat. No. 4,241,942 discloses a secure contest card for temporarily and completely concealing the presence, absence, position or nature of indicia printed on the card comprising a smooth surface card material having an upper surface and a lower surface. A patterned irregular layer of material printed either immediately above, below or above and below printed indicia on the upper surface of the card stock is covered with an opaque removable mask. This technique is complex because the required opaque removable mask blocks the view of desired indicia while concealing the indicia meant to be hidden until the time of use. The mask layer is destroyed when it is removed and does not separate cleanly as the present invention.

Schultz, U.S. Pat. No. 4,180,929 discloses a tamper evident label construction consisting of multiple layers of protective film where a strong film is applied to a fragile film having adhesive on the opposite side. Multiple indicia, masking and adhesive layers are applied with a transparent or tinted polymeric coating over the masking material in a complex manufacturing process. One set of indicia is visible on one of the film layers until the complex and costly multi-film layered structure is tampered with which reveals indicia on the second film layer while maintaining the integrity of the indicia on the first film layer. The costly and complex tamper evident label system of Schultz is not suitable for the mass market because of not only because of cost and complexity because it does not provide for a means to clearly read graphics on the article below the label and can not be customized by the converter purchasing and printing the label substrate because the indicia in a select pattern and the masking layers are applied by the manufacturer of the label substrate, not the printer.

Grotzner, U.S. Pat. No. 6,358,607 teaches a label for covering confidential information having a base layer with opposed first and second surfaces. A transparent adhesive seal layer is attached to the first surface to affix the label to an article and an irreversibly removable opaque scratch-off layer is attached to the second surface with an authentication mark attached to the scratch-off layer. A coating between the base layer and adhesive provides for adhesion to the object with one force and to the base layer with another force in locally different areas with different strength values in a pattern. The "coating" incorporates at least an ink film and the random or registered printing of bonding agents and anti- and stick lacquers. If the base layer is separated from the object, the ink film remains partially stuck to the base layer and partially stuck to the object causing an irreversible optically visible alteration of the colored layer of the label but not a color change. The base label has the same tamper evident functionality as the prior art of record discussed thus far. The novelty of the invention is the addition of an irreversibly removable scratch off-layer with an authentic mark.

All of the prior art patents cited thus far provide for technology which is unsuitable for use in tamper evident applications which necessitate clean separation of the layers of indicia, bonding agents, lacquers, adhesives and ink films. In each of the cited prior art patents there is residue evident on at least one of the layers at the separation point interface. Additionally, none of the prior art patents teach a chameleon type color change indicating separation of the layers to show that the layers have been tampered with or to reveal masked information. The prior art produces opacity or distortions based and varying adhesion of ink layers, adhesives and lacquers that makes it difficult to see through the tapes and labels to view indicia below. In the current invention, information can still be cleanly viewed through the intermediate if an attempt has been made to remove the intermediate.

Scheggetman, U.S. Published Patent Application Ser. No. 20020056990 A1 May 16, 2002, describes a tamper evident business form where a first transparent upper laminate having a textured lower surface adapted to receive confidential information on it's upper surface is combined with a second lower laminate having a complementary textured upper surface such that the upper laminate appears transparent and such that the upper laminate appears noticeably less transparent when it is separated from the lower laminate and the complementary textured surfaces are exposed. The structure is used in conjunction with an opaque scrambling pattern which prevents reading of the confidential information. Scheggetman's invention uses intimate contact clarity between layers to create transparency out of translucent layers, not the present inventions color changing combinations of layers that change color when separated. In Scheggetman, one side of the laminate is affixed over an opaque scramble pattern on a business form and the other side of the laminate is imaged with confidential information that is not visible until the laminate is separated from the opaque scramble pattern. When separated from the confidential indicia concealing blocking scramble pattern, the layer of laminate with the confidential information becomes translucent creating contrast to visually see the confidential information printed with a gray screen. Translucency is also used as a tamper evident feature to indicate that the layer has been separated.

The present state of the art shows that tamper evident labels and tapes can be produced using combinations of substrates, adhesives, ink films, patterned coatings, stress opacifying films, lacquers, bonding agents and combinations of all these components in complex multi-layer costly substrates. The prior art substrates are customized by the manufacturer of the base tape or label substrate. This limits the application to standard tamper evident applications where the word "void" or "opened" may appear when the label or tape is lifted. Additionally confidential information on tamper evident constructions can be masked by scramble patterns or hidden below removable mask or scratch off layers.

This invention provides for tape, label, card and game intermediates that will show evidence of use and conceal proprietary, gaming, promotional or redeemable information until the intermediate is separated. One form of the intermediate includes a substrate of clear or colored transparent polymeric film or colored translucent paper with one side coated with at least one judiciously selected cleanly separable translucent tinted coatings in intimate contact to form one translucent color that leave no residue when separated. Indicia of a different color not meant to be masked or hidden can be applied to either side of the combined translucent layer is visible. The coated layers when separated split into two different colored layers effecting a color change to show evidence of use. This contrasts with the prior art where tamper evidence is defined by irreversible separated layers of patterns of indicia, ink layers, bonding agents, adhesives, ink films, etc. in combination with layers of transparent or translucent film, stress opacifying film, scramble patterns, authentic markings and scratch off layers. The simple combination of two colored translucent layers combining into a one color translucent layer until the layers are separated is a simple cost effective way to show evidence of separation or use. Optionally, the "chameleon effect" of separation of the layers causing a color change of the invention is useful for masking printed indicia until the layers are separated as the layer is used. This can be for gaming pieces or redeemable articles, contests or for masking confidential information such as credit card and pin numbers and the like where the user intentionally separates the intermediates layers to reveal information such as winning a prize or exposing a PIN number. The intermediate can be used for applications without intended separation that will reveal information for tamper evident purposes only such as exposing the word "void", a customized message or just a simple color change to show the article was tampered with. To accomplish this, indicia can be applied by the converter or printer to the exposed surface of the intermediate opposite the article it is affixed to or can be printed on an article with the intermediate affixed over the indicia. The indicia color or tint is selected to be the same color or one dominated by the color combination of the translucent colored layers in intimate contact so that it is invisible to the eye until the layers of the intermediate are separated.

It has now been found that making a color changing or "chameleon" label or tape intermediate with the ability to mask and expose information or provide tamper evident features based on a color change of translucent layers on separation of the layers allows surprising ease of manufacture and attractive economics. Additionally, the flexibility to customize on demand information not available before to converters of materials of this type who were locked into standard patterns from substrate suppliers is a distinguishing feature of this invention versus the prior art tamper evident labels and tapes. The entire intermediate of this invention is translucent so indicia can be viewed through it and the color change after separation covers the entire interface area of the separated layers. There is no ink, adhesive, bonding or lacquer layers transferring to one or both separated layers obstructing the clarity or scrambling the image to read indicia on the surface of the exposed layer of the intermediate or on the article the intermediate was affixed to. The images desired to be exposed upon separation of the layers can be customized by an end user not the substrate manufacturer using conventional flexographic, gravure or lithographic techniques or by electronic imaging techniques. The electronic imaging techniques include but are not limited to color ink jet, thermal transfer, laser, direct thermal, dye diffusion thermal transfer and other toner and variable information printing technologies. The ability to easily customize a base intermediate instead of purchasing pre-patterned materials with the pattern imbedded in the structure from substrate suppliers is a significant advancement in this art especially with the rapid advancement of on demand colored variable imaging techniques. Conceivably, every intermediate could have a unique variably imaged identifier exposed on separation of the layers.

It has also been found that the process for making tamper evident intermediates and articles with masked confidential information to be exposed at a later time is simplified, and an improved and more customizable product is obtained, if a translucent colored layer is caused to reversibly develop on the substrate through the combination of at least two translucent colored layers in intimate contact that form a new color or retains the color and shade of the dominant color in the combination until the layers are reversibly separated into the original translucent colors. Intimate contact between colored layers is defined as one colored layer on top of another or separated by a another translucent or clear bonding layer which can be a coating, adhesive or film. Translucent layers are defined as a layers through which an underlying indicia, surface or pattern can been viewed when the translucent layer is affixed in intimate contact preferably through the use of a clear pressure sensitive or heat activated adhesive to the underlying indicia, surface or pattern.

A principal object of the present invention is to provide for the use of separable translucent intermediates for use in tamper evident labeling and tape applications and in area's information technology, gaming and commerce where the intermediates are used to conceal information until needed by the rightful end user by separation of the layers to expose the information. Specific mention is made of a preferred embodiment adapted for use as a credit card signature stripe with embedded confidential information. A second preferred embodiment incorporates a removable scratch off coating on the exposed surface of the intermediate masking confidential information visible through the intermediate that shows tamper evident color change if it was attempted to lift the layers to look below the scratch off coating covering the confidential information. In this embodiment, it is contemplated that the confidential indicia imaged on an article covered with the intermediate of this invention is the same color or a color dominated by the layer closest to and adhered to the image. On separation of the layers, the confidential information blends into the attached layer and is not visible to the eye.

It is also contemplated that the make up of the translucent layers can be as follows:

Colored translucent polymeric film layers joined in intimate contact by a clear or colored adhesive layer.

A combination of at least one colored translucent polymeric film layer and at least one colored translucent coated layer At least two colored translucent coated layers coated in intimate contact onto a clear polymeric film substrate.

These and other objects of the invention will become apparent from the present specification.

SUMMARY OF THE INVENTION

Figure 1:
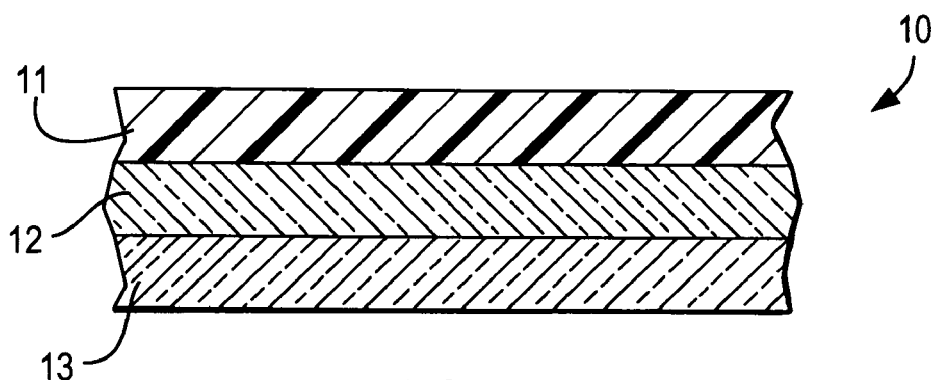
FIG. 1 is a cross-section view of the color changing intermediate constructed in accordance with one embodiment of the present invention using a clear film and two colored translucent coated layers.

According to this invention, there is provided a color changing coated and or laminated intermediate used for tamper evident color changing or masking substrates to reveal information upon the separation of layers of the intermediate, comprising:
(i) a colored translucent layer having an upper surface and a lower surface;
(ii) a second translucent colored layer having an upper surface and a lower surface, the upper surface being intimately and removably adhered to the lower surface of said colored translucent layer (i) to form a combined translucent color that is the product of the combination of the colors of the two layers or is the dominant color of the two layers;

(iii) a reversible separable interface at the interface of the two colored layers that when separated produces a color change back to the original colors of the separate colored translucent layers Either color layer may cover all or from 10-90%, preferably 30-70% of the total area of the translucent layer.

In preferred embodiments:

the translucent colored layers can be at least two coated layers applied to a transparent film, at least two translucent colored film layers intimately joined by a clear or translucent colored adhesive or a combination of translucent colored film layers and translucent coated layers to create a color change or dominant color when the layers are combined that is reversible to the original colors when the layers are separated; and the translucent colored film layers or clear transparent film layer comprise any clear polymer film preferably polyester or olefin films, 0.2 to 7 mils thick; and any combination of colors intimately and reversibly attached that make up the combined layer and resultant colored layer that when separated produce two visually different colors; and the intimate and reversible bond between at least two colored translucent coated layers is accomplished by coating one colored layer on top of another; and the intimate and reversible bond between at least one colored translucent coated layer and at least one colored translucent film layer is accomplished by coating the coated layer onto the film layer; and the coat weight of translucent colored coatings is in the range of 0.25-15 grams/MSI the intimate and reversible bond between at least two colored translucent film layers is accomplished by a clear or colored removable adhesive or by coextrusion of the layers at the time of manufacture; and the translucent colored layers are formulated to be firmly adherent for handling of the intermediate but "separable" or "reversible" after one layer has been affixed to and article or item and an attempt is made to separate the intermediate; In another of its major aspects, the present invention contemplates the intermediate as described above combined with:

a pressure sensitive adhesive layer and removable backing layer to affix the intermediate to an article; or indicia on an article printed between and in intimate contact with the translucent film layer (clear or colored) and one of the other colored layers in a color and shade the same as the color of the combined layers so it is masked by the combined colored translucent layers when they are affixed over the indicia on the article, such indicia only visible when the translucent colored layers are separated; and In another of its major aspects, the present invention contemplates the intermediate as described above combined with:

a pressure sensitive adhesive layer and removable backing layer to affix the intermediate to an article; or indicia on an article printed between and in intimate contact with the translucent film layer (clear or colored) and one of the other colored layers in a color and shade the same as the color of the combined layers so it is masked by the combined colored translucent layers when they are affixed over the indicia on the article, such indicia only visible when the translucent colored layers are separated; and In another of its major aspects, the present invention contemplates the intermediate as described above combined with:

a pressure sensitive adhesive layer and removable backing layer to affix the intermediate to an article; or a thermally activated adhesive layer to affix the intermediate to an article; and indicia on an article printed in a color and shade the same as the color of the combined layers so it is masked same as the color of the combined layers so it is masked by the combined colored translucent layers when they are affixed over the indicia on the article, such indicia only visible when the translucent colored layers are separated; and indicia on an article printed in a color and shade different from the color of the combined layers but dominated by the color of the combined layers so it is masked by the combined colored translucent layers when they are affixed over the indicia on the article, such indicia only visible when the translucent colored layers are separated; and indicia on an article printed in a color that will not be masked by the combined colored translucent layers when they are affixed over the indicia on the article and is visible through the intermediate before the layers are separated and after the layers are separated; and indicia on an article printed in a color that will not be masked by the combined colored translucent layers when they are affixed over the indicia on the article and is visible through the intermediate before the layers are separated but not after the layers are separated; and indicia on the exposed surface of the intermediate printed in a color and shade the same as the color of the combined layers so it is masked by the combined colored translucent layers, , such indicia only visible when the translucent colored layers are separated; and indicia on the exposed surface of the intermediate printed in a color and shade different from the color of the combined layers but dominated by the color of the combined layers so it is masked by the combined colored translucent layers, such indicia only visible when the translucent colored layers are separated; and indicia on the exposed surface of the intermediate printed in a color that will not be masked by the combined colored translucent layers and is visible on the intermediate before the layers are separated and after the layers are separated; and indicia on the exposed surface of the intermediate printed in a color that will not be masked by the combined colored translucent layers and is visible on the intermediate before the layers are separated but not after the layers are separated; and indicia on the exposed surface of the intermediate and the surface of the article as outlined above in any combination of visible before or after separation as required by the end user; and multiple colors of indicia can be used for best graphic presentation; and clear or translucent protective coatings can be applied over indicia on the exposed surface of the intermediate for scuff and rub resistance or to change or equalize the gloss level of the surface of the intermediate to aid in masking the presence of the indicia in the reflection of light; and print receptive coatings applied to the exposed (non adhesive) surface of the intermediate that can be customized by a converter or printer including print receptive coatings for flexographic, gravure or lithographic inks to help improve ink adhesion and/or receive images from ink jet, thermal transfer, laser, dye diffusion and other types of electronic imaging printers.

a preferred embodiment utilizes a removable masking layer such as a scratch off coating in combination with the intermediate of the invention applied over part or the entire intermediate surface.

DETAILED DESCRIPTION OF THE INVENTION

Referring to FIG. 1, color changing intermediate structure 10 is comprised of a clear or translucent polymeric film layer 11 to which two colored translucent layers 12 and 13 are reversibly combined in intimate contact through coating or laminating to form a color different from the original colors or the dominant color of the two.

Figure 2:
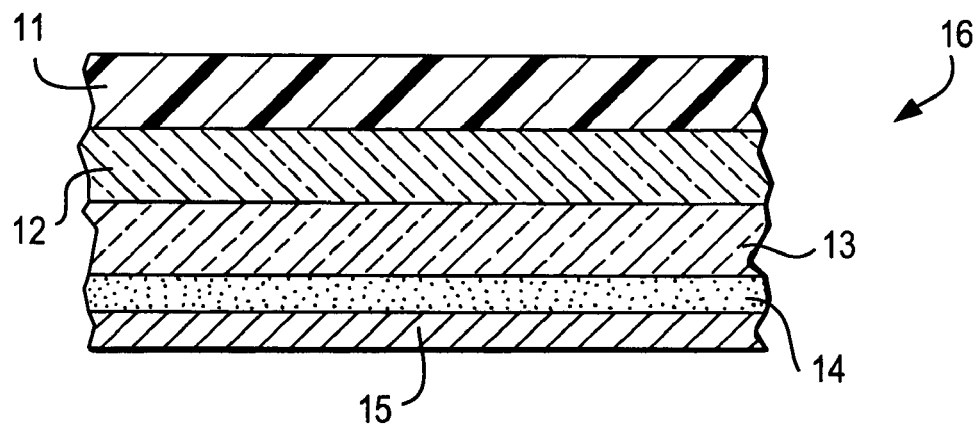
FIG. 2 illustrates the intermediate of FIG. 1 with an adhesive layer and optional release backing.

Referring to FIG. 2, this embodiment of the invention is intermediate 10 that shows the addition of adhesive layer 14 and optional release backing 15 if a pressure sensitive adhesive is used on intermediate 10 of FIG. 2. to affix the intermediate to an article, resulting in intermediate 16.

Figure 3:
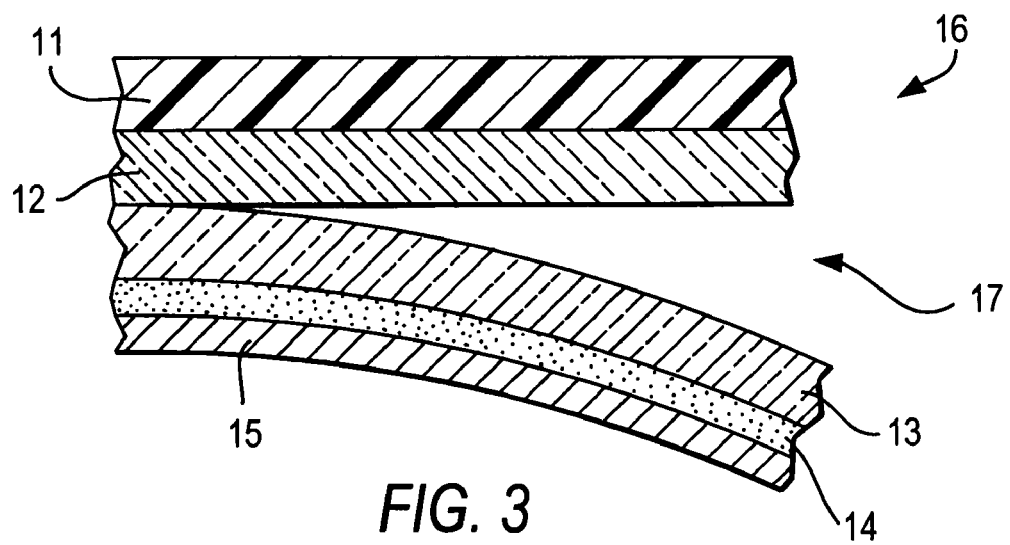
FIG. 3 shows the separation interface of the colored layers of FIG. 2 to generate a color change in accordance with the present invention.

Referring to FIG. 3, this embodiment of the invention shows intermediate 16 illustrating the separation interface 17 of the layers of intermediate 16 as illustrated in FIG. 2.

Figure 4:
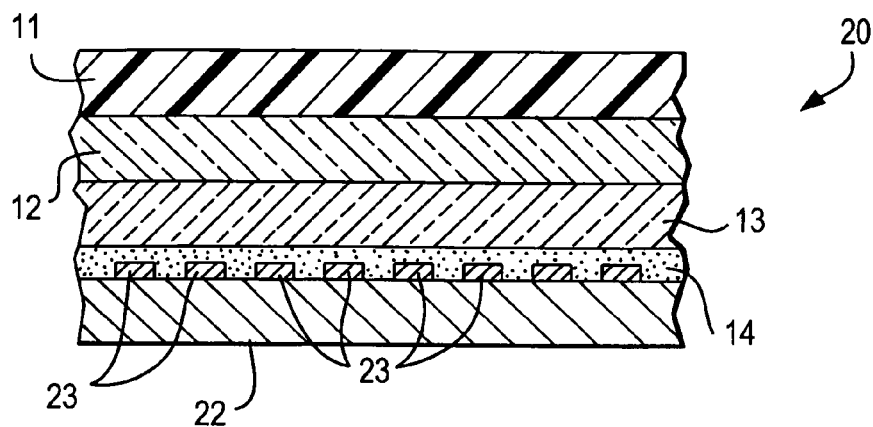
FIG. 4 illustrates the intermediate of the present invention as depicted in FIG. 2 affixed to a card stock with printed indicia between the card stock and the separable layers.

Referring to FIG. 4, this embodiment illustrates the intermediate 20 comprising a clear polymeric film layer 11 coated with two colored translucent layers 12 and 13 with pressure sensitive adhesive layer 14 affixed to a card stock 22 with indicia 23 on the surface of the card stock covered with the adhesive 14 of the intermediate.

Figure 5:
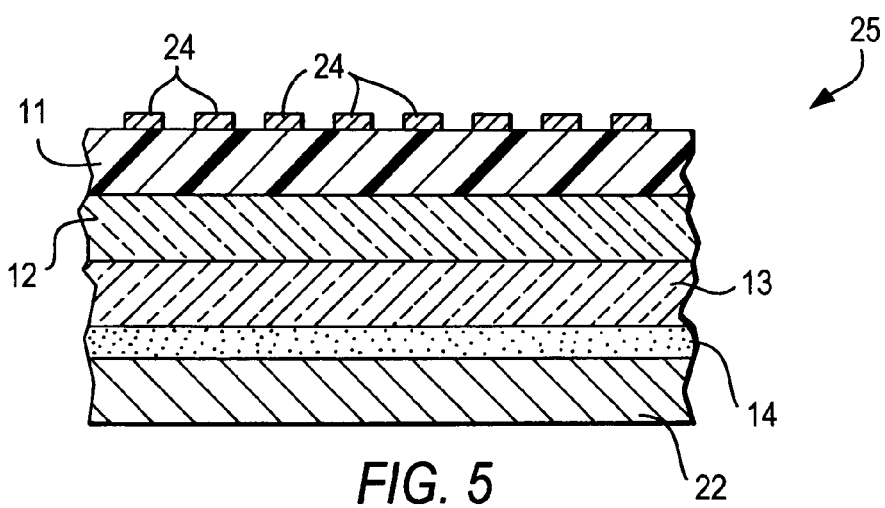
FIG. 5 illustrates the intermediate of the present invention as depicted in FIG. 2 affixed to a card stock. Printed indicia is indicated on the exposed surface of the intermediate.

Referring to FIG. 5, this embodiment 25 illustrates the intermediate comprising a clear polymeric film layer 11 coated with two colored translucent layers 12 and 13 with pressure sensitive adhesive layer 14 affixed to a card stock 22 with indicia 24 on the surface of the intermediate.

Figure 6:
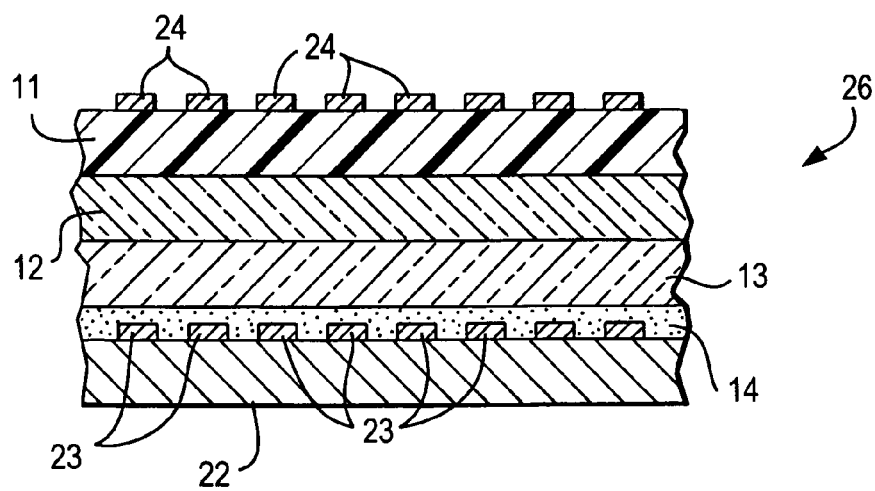
FIG. 6 incorporates the printed indicia of FIG. 4 and FIG. 5.

Referring to FIG. 6, this embodiment 26 illustrates the intermediate comprising a clear polymeric film layer 11 coated with two colored translucent layers 12 and 13 with pressure sensitive adhesive layer 14 affixed to a card stock 22 with indicia 24 on the surface of the intermediate and with indicia 23 on the surface of the card stock covered with the adhesive 14 of the intermediate.

Figure 7:
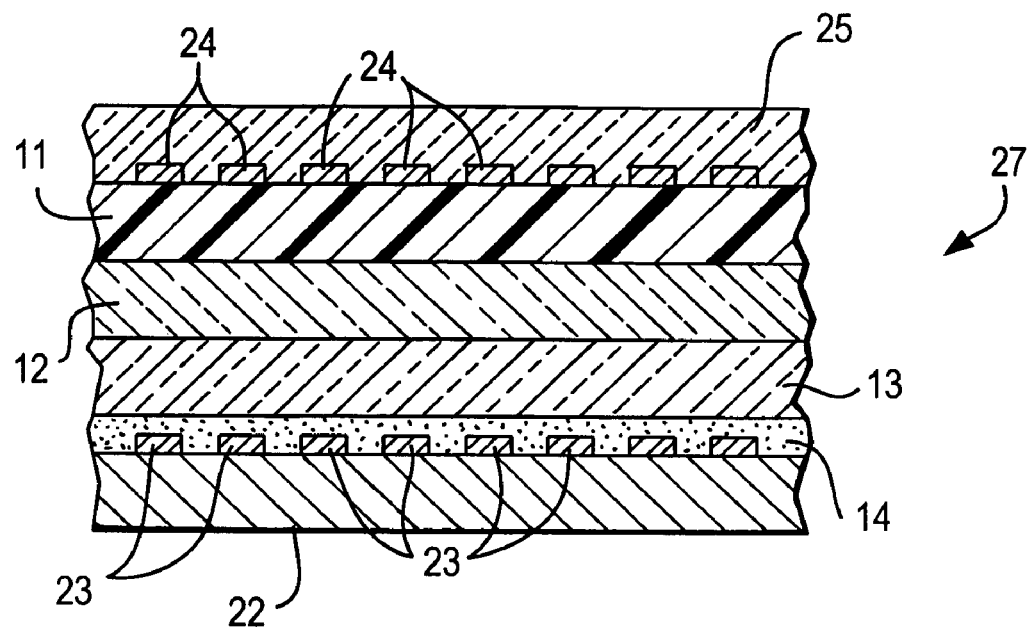
FIG. 7 shows the embodiment of FIG. 6 with the addition of a protective coating applied over the printed indicia of the intermediate.

Referring to FIG. 7, this embodiment 26 as illustrated in FIG. 6 with the addition of a protective and gloss controlling coating 25 applied over the exposed printed indicia of the intermediate 27.

Figure 8:
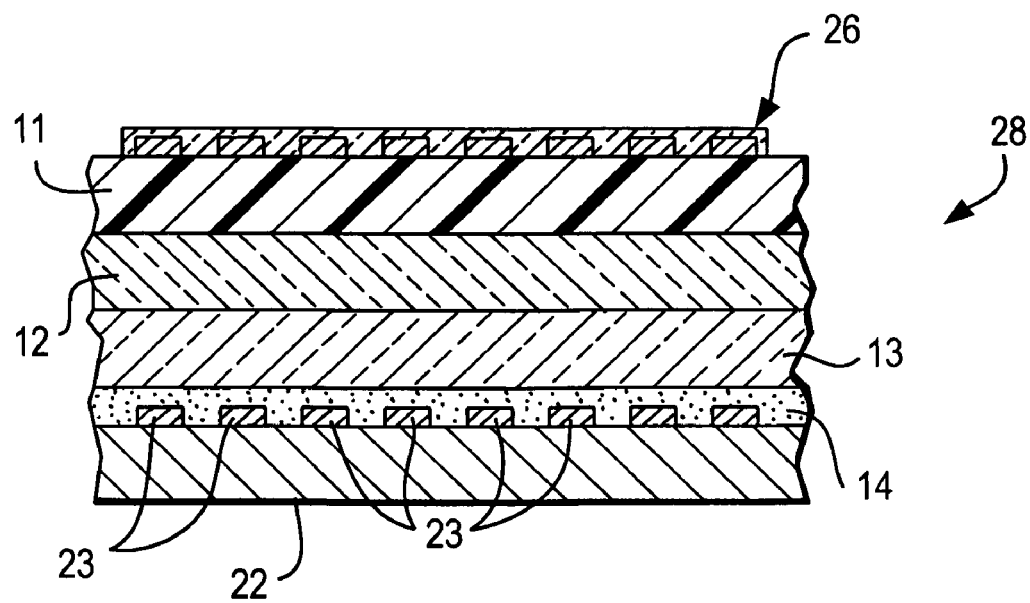
FIG. 8 shows the embodiment of FIG. 4 with the addition of a removable masking layer covering the indicia that could be viewed without the mask through the translucent intermediate applied to a card.

Referring to FIG. 8, this embodiment 28 illustrates the embodiment of intermediate 20 of FIG. 4 with a removable masking layer 26 partially disposed over the surface of the exposed intermediate film layer 11 masking the printed indicia 23 on the base card 22.

Figure 9:
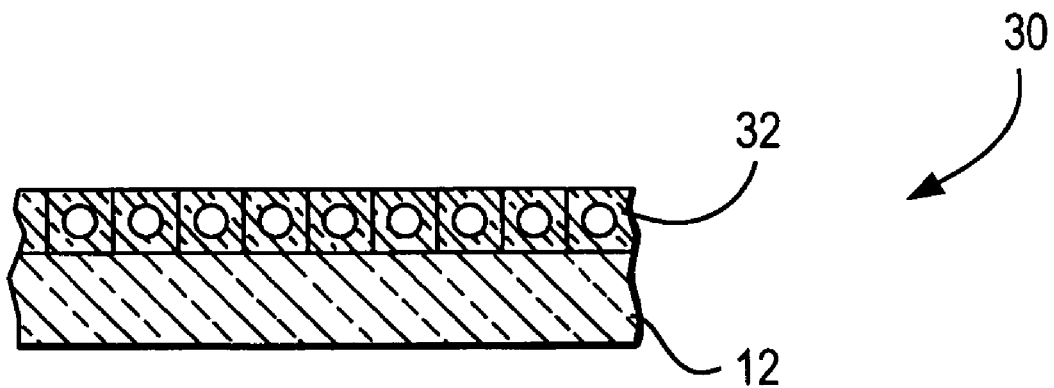
FIG. 9 is a cross-section view of the color changing intermediate constructed in accordance with another embodiment of the present invention using a colored translucent film and at least one colored translucent coated layer.

Referring to FIG. 9, this embodiment 30 illustrates another method for constructing the color changing intermediate. Structure 30 is comprised of at least one layer of a colored translucent polymeric film 32 and at least one layer of a coated colored translucent layer 12 reversibly combined in intimate contact to form a color different from the original colors or that is the dominant color of the two. This embodiment is interchangeable with the embodiment in FIG. 1 and is interchangeable in the embodiments of FIG. 2-FIG. 8.

Figure 10:
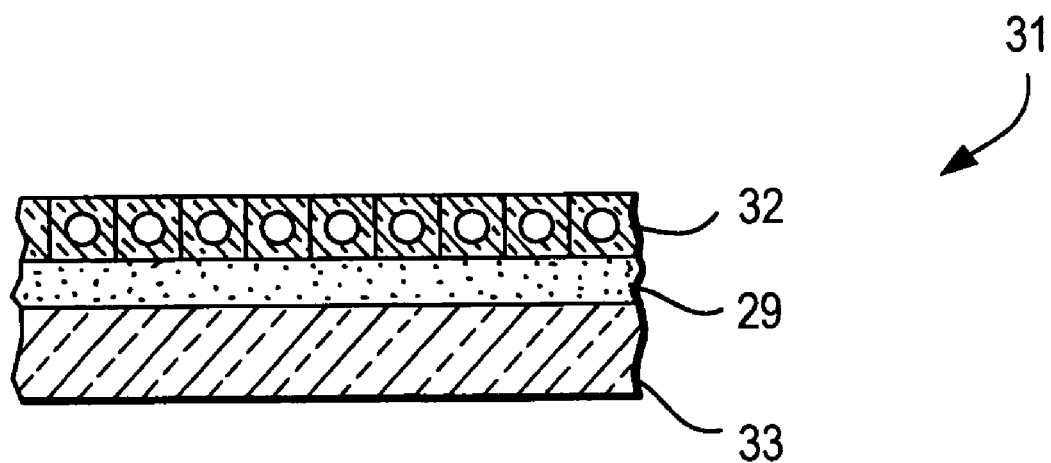
FIG. 10 is a cross-section view of the color changing intermediate constructed in accordance with another embodiment of the present invention using at least two colored translucent film layers joined in intimate contact by a clear or colored translucent adhesive layer.

Referring to FIG. 10, this embodiment 31 illustrates another method for constructing the color changing intermediate. Structure 31 is comprised of at least two layers of a colored translucent polymeric film 32 and 33 and a layer of clear or colored adhesive 29 joining the film layers in reversible intimate contact to form a color different from the original colors or that is the dominant color of the two. This embodiment is interchangeable with the embodiment in FIG. 1 and is interchangeable in the embodiments of FIG. 2-FIG. 8.

Many different polymeric films such as polyester, polypropylene, vinyl, polyethylene or combinations can be used to achieve the results of the invention. It is optional to use corona, flame or plasma treatment as is conventional in the art to promote adhesion of a coated layer to a polymeric layer. Colored translucent layers coated in intimate contact with one another are formulated to be reversible which means they will cleanly separate without transfer of one layer to another in whole or in part to become two separate and distinct colored layers. Adhesives used to intimately bond layers of colored translucent films are formulated for clean reversibility or separation of the film layers. This means a clear adhesive can be used that will transfer to one or both of the films when separated maintaining the integrity of the colors of the separate film layers. Additionally, a colored adhesive can be used that will transfer to or stay with one film layer when separated to maintain the different color integrity of the two layers after reversible separation. The bond between the layers at the separation interface is a peelable bond.

The determination of fitness for use is a practical one where intermediates are made using different chemistries for colored translucent coatings and different, clear or colored, polymeric films or, clear or colored, translucent paper and are combined together in intimate contact to show the new color or the dominant color present. The intermediate is then separated to expose the original colors.

EXAMPLES BASED ON LABORATORY EVALUATION AND PRODUCTION TEST MATERIAL

Example 1

An intermediate consisting of one clear layer polymeric film layer and coated yellow and blue colored translucent layers was prepared as follows:

Step 1—A coating composition consisting of the following was prepared to create a yellow translucent coating:

| Ingredient | Parts | Supplier |
| --- | --- | --- |
| Acrylic Emulsion Resin 26091 | 30 | B. F. Goodrich |
| Yellow Tint Y02 | 8 | ASI |
| Aziridine Crosslinker | 2 | Zeneca Resins |
| Silica Particles | 6 | Degussa |
| Water | 54 | — |
| | 100 | |

The above composition was coated at a nominal 1.5 grams/MSI On clear corona treated 1 mil biaxially-oriented polyester. After forced hot air drying and allowing 48 hours for the coating composition to cure to a permanent bond on the clear polyester film, the resultant film with the coating is colored yellow and translucent and is firmly adhered to the polyester.

MSI is defined as 1000 square inches

Step 2—A second coating composition was prepared as follows to create a blue translucent coating:

| Ingredient | Parts | Supplier |
|---|---|---|
| Polyethylene Emulsion Resin PE40 | 50 | Chemical Corp |
| Dark Blue Tint BL06 | 8 | ASI |
| Water | 42 | — |
| | 100 | |

The above composition was coated at a nominal 5 grams/MSI on top of the yellow coating adhered to the polyester film and was hot air dried. The resultant intermediate is a translucent blue matching the dominant shade of the blue coating as viewed through the clear polyester layer. At this point, conventional pressure sensitive packaging tape was applied to the surface of the translucent blue layer and adhesion was allowed to build for 15 minutes. The tape was then peeled off simultaneously removing the blue translucent layer from intimate contact with the yellow translucent layer demonstrating the reversible color change between the layers.

Example 2

Step 1—To the intermediate of Example 1, pressure sensitive adhesive DyTac 9053 a rubber acrylic blend available from DynaTech Adhesives was coated onto the blue translucent layer and force hot air dried creating a pressure sensitive tape substrate.

Step 2—the pressure sensitive tape substrate from Step 1 was applied over the black indicia of a label on a box at the flaps to seal it closed.

Step 3—The tape was partially removed and in areas where it was lifted, the translucent colored layers separated and the color visible looking through the clear film layer changed from blue to yellow indicating that the tape had been tampered with.

Example 3

Step 1—the tape intermediate of Example 2 was laminated to a 1.5 mil polyester release liner L3 release level available from Siltech, a division of Technicote to create a removable backing label intermediate.

Step 2—a label was cut out of the intermediate from Step 1, the release liner was removed to expose the pressure sensitive adhesive and the intermediate was applied over a PIN# on the back of a commercially available phone card. The black PIN number was readable through the translucent colored intermediate. The clear polyester substrate was lifted from the card at the edges of the label through separation of the translucent colored layers. The polyester at the separation points now appeared yellow indicating it was tampered with.

Example 4

Step 1—indicia the same color as the label intermediate of Example 3 was applied to the surface of the clear polyester around the perimeter of the label. The indicia on the surface of the label intermediate was not readily visible to the naked eye because the color matched the color achieved though the intimate contact of the colored translucent layers.

Step 2—The release liner of the label intermediate of Step 1 was removed to expose the pressure sensitive adhesive and the intermediate was applied over a PIN# on the back of a commercially available phone card. The black PIN number was readable through the translucent colored intermediate. The clear polyester substrate was lifted from the card at the edges of the label through separation of the translucent colored layers. The polyester at the separation points now appeared yellow indicating it was tampered with and the blue indicia on the surface of the clear polyester layer was now visible.

Example 5

Step 1—A matte translucent varnish was applied over the surface indicia of the label intermediate of Example 4 to protect the indicia and mask optical properties in the refection of light by creating a surface on the polyester with indicia that is uniform in appearance. The indicia on the surface of the label intermediate was not visible to the naked eye because the color matched the color achieved though the intimate contact of the colored translucent layers and the gloss level of the over coated polyester and indicia was uniform. It is contemplated from the example that optically variable over coatings could also be used to create a different but uniform translucent surface finish.

Step 2—The release liner of the label intermediate of Step 1 was removed to expose the pressure sensitive adhesive and the intermediate was applied over a PIN# on the back of a commercially available phone card. The black PIN number was readable through the translucent colored intermediate. The clear polyester substrate was lifted from the card at the edges of the label through separation of the translucent colored layers. The polyester at the separation points now appeared yellow indicating it was tampered with and the blue indicia on the surface of the clear polyester layer was now visible.

Example 6

A an intermediate consisting of one clear polymeric film layer and coated yellow and blue translucent colored layers was prepared as follows:

Step 1—A light blue coating composition consisting of the following was prepared to create a light blue translucent coating:

| Ingredient | Parts | Supplier |
|---|---|---|
| Acrylic Emulsion Resin 26091 | 50 | B. F. Goodrich |
| Dark Blue Tint BL06 | 3 | ASI |
| Aziridine Crosslinker | 2 | Zeneca Resins |
| Water | 45 | — |
| | 100 | |

The coating was applied at a nominal 2.5 grams/MSI to the corona treated polyester as in Example 1 above and allowed to cure for 48 hours.

Step 2—a yellow coating composition was prepared as follows:

| Ingredient | Parts | Supplier |
|---|---|---|
| Acrylic Emulsion Resin 26091 | 30 | B. F. Goodrich |
| Yellow Tint Y02 | 5 | ASI |
| Silica Particles | 6 | Degussa |
| BYK 301 Anti-Mar Agent | 5 | Byk Chemie |
| Surfynol 440 Wetting Agent | 2% | Air Products |
| Water | 52 | — |
| | 100 | |

The above composition was coated at a nominal 3 grams/MSI on top of the blue coating adhered to the polyester film from Step 1 and was hot air dried. The resultant intermediate is a translucent light green which is a result of the intimate contact between the yellow and blue translucent colored layers as viewed through the clear polyester layer. At this point, conventional pressure sensitive packaging tape was applied to the surface of the translucent green layer of the intermediate on the side opposite the polyester and adhesion was allowed to build for 15 minutes. The tape was then peeled off simultaneously removing the yellow translucent layer from intimate contact with the blue translucent layer demonstrating the reversible color change between the layers with the green combination separating into yellow and blue layers.

Example 7

Step 1—To the intermediate of Example 6, pressure sensitive adhesive DyTac 9053 a rubber acrylic blend available from DynaTech Adhesives was coated onto the green translucent layer and was force hot air dried to creating a pressure sensitive tape substrate.

Step 2—the pressure sensitive tape substrate from Step 1 was applied over the black indicia of a label on a box at the flaps to seal it closed.

Step 3—The tape was partially removed and in areas where it was lifted, the combined translucent colored green layers separated and the color visible looking through the clear film layer changed from green to blue indicating that the tape had been tampered with.

Example 8

Step 1—the tape intermediate of Example 7 was laminated to a 1.5 mil polyester release liner L3 release level available from Siltech, a division of Technicote to create a removable backing label intermediate.

Step 2—a label was cut out of the intermediate from Step 1, the release liner was removed to expose the pressure sensitive adhesive and the intermediate was applied over a black PIN# on the back of a commercially available phone card. The PIN number was readable through the translucent colored green intermediate. The clear polyester substrate was lifted from the card at the edges of the label through separation of the translucent colored layers. The polyester at the separation points now appeared blue indicating it was tampered with.

Example 9

Step 1—indicia the same color as the label intermediate of Example 8 was applied to the surface of the clear polyester around the perimeter of the label. The indicia on the surface of the label intermediate was not readily visible to the naked eye because the color matched the color achieved though the intimate contact of the colored translucent layers.

Step 2—The release liner of the label intermediate of Step 1 was removed to expose the pressure sensitive adhesive and the intermediate was applied over a black PIN# on the back of a commercially available phone card. The PIN number was readable through the translucent colored intermediate. The clear polyester substrate was lifted from the card at the edges of the label through separation of the translucent colored layers. The polyester at the separation points now appeared blue indicating it was tampered with and the green indicia on the surface of the clear polyester layer was now visible. It was noted that the indicia was not as visible as in Example 4 and care should be taken to use better contrasting colors.

Example 10

Step 1—A matte translucent varnish was applied over the surface indicia of the label intermediate of Example 9 to protect the indicia and mask optical properties in the refection of light by creating a surface on the polyester with indicia that is uniform in appearance. The indicia on the surface of the label intermediate was not visible to the naked eye because the color matched the color achieved though the intimate contact of the colored translucent layers and the gloss level of the over coated polyester and indicia was uniform. It is contemplated from the example that optically variable over coatings could also be used to create a uniform surface finish.

Step 2—The release liner of the label intermediate of Step 1 was removed to expose the pressure sensitive adhesive and the intermediate was applied over a black PIN# on the back of a commercially available phone card. The PIN number was readable through the translucent colored intermediate. The clear polyester substrate was lifted from the card at the edges of the label through separation of the translucent colored layers. The polyester at the separation points now appeared blue indicating it was tampered with and the green indicia on the surface of the clear polyester layer was now visible. It was noted that the indicia was not as visible as in Example 4 and care should be taken to use better contrasting colors.

Example 11

Step 1—indicia the same color as the label intermediate of Example 4 was applied to the surface of the clear polyester around the perimeter of the label and was applied to a white card substrate.

Step 2—The release liner of the label intermediate of Step 1 was removed to expose the pressure sensitive adhesive and the intermediate was applied over a indicia on the card substrate using the pressure sensitive adhesive. The indicia on the surface of the label intermediate was not readily visible to the naked eye because the color matched the color achieved though the intimate contact of the colored translucent layers. The indicia on the surface of the card below the intermediate was not readable to the naked eye because the color matched the color achieved though the intimate contact of the colored translucent layers. The clear polyester substrate was lifted from the card completely through separation of the translucent colored layers. The blue indicia on the surface of the clear polyester layer was now visible because of the yellow translucent layer on the opposite side. The blue indicia below the blue transparent layer affixed to the card was not visible.

Example 12

Step 1—indicia the same color as the label intermediate of Example 8 was applied to the surface of the clear polyester around the perimeter of the label and to a white card substrate.

Step 2—The release liner of the label intermediate of Step 1 was removed to expose the pressure sensitive adhesive and the intermediate was applied over the indicia on the card substrate using the pressure sensitive adhesive. The indicia on the surface of the label intermediate was not readily visible to the naked eye because the color matched the color achieved though the intimate contact of the colored translucent layers. The indicia on the surface of the card below the intermediate was not readable to the naked eye because the color matched the color achieved though the intimate contact of the colored translucent layers. The clear polyester substrate was lifted from the card completely through separation of the translucent colored layers. The green indicia on the surface of the clear polyester layer was now visible because of the blue translucent layer on the opposite side though it was noted better contrasting colors would produce a more visible result. The green indicia below the yellow transparent layer affixed to the card was visible as a lighter shade.

Step 3—Conventional ball point pen was used to write on the yellow layer affixed to the card substrate as a signature stripe would be on a credit card and it was noted that the layer received ink well. The intermediate of this example can be used as a tamper evident signature stripe that would be applied to the card as a label. It would be used to concealing and/or show colored information such as PIN #'s below the intermediate and instructions such as "Peel Here" etc. on the surface of the polyester layer as desired before and/or after separation of the intermediate. In the case of a signature stripe, separation of the intermediate would be performed by the owner of the card to access the signature stripe, and reveal the confidential PIN# in a secure manner knowing the card had not been tampered with.

Example 13

The intermediate of Example 5 was over coated in a select area with a black scratch off material available from Process Resources Corp. denoted SO-567. The intermediate was then applied to the back side of a commercially available phone card with the scratch off oriented so it covered the PIN Access Number. The scratch off material was removed and the PIN number exposed which was now readable through the intermediate.

Example 14

Step 1—A clear ink jet receptive coating was applied to the surface of the label intermediate of Example 4 that had been affixed to copy paper by removing the release liner. Indicia the same color as the combination of the layers of the intermediate was applied to the surface of the clear ink jet coating using a Lexmark 3200 color ink jet printer in the form of a text message "You Have Won A New Car—Call Now". Multiple test prints of different shades of blue to find the correct shade of the indicia on the surface of the label intermediate were required until the indicia was masked with the ink color matching the color achieved though the intimate contact of the colored translucent layers. The message was not readily visible to the naked eye. The clear polyester substrate was lifted from the card completely through separation of the translucent colored layers. The blue ink jet indicia on the surface of the ink jet coating on the clear polyester layer was now visible because of the yellow translucent layer on the opposite side.

The patents, applications, examples and test methods mentioned above are incorporated herein by reference.

Many variations of the present invention will suggest themselves to those skilled in the art in light of the above detailed description to create color changing or "chameleon" intermediates for use in tamper evident and masking tape and label applications. For example, there are an infinite number of color combinations available. A practical test must be employed to ensure the proper contrast between translucent coated layers when separated and printed indicia if any is used. Instead of polyester, polyolefins can be used. Instead of a colored translucent coating or coatings, a colored translucent film or films can be used. Instead of a pressure sensitive adhesive, a heat activated adhesive can be used.

The ability of the end user to customize their product by printing indicia on the intermediate substrate or the article instead of relying on pre-configured label and tape substrates from suppliers with fixed messages. The market will be expanded to users that do not have the ability to manufacture the types of materials defined by the prior art. They will have the ability to create custom messages by purchasing a "Chameleon" label substrate to be used in an ink jet printer now connected to the majority of computers in America or other types of electronic imaging devices. This is a critical aspect of the invention. All such obvious modifications are within the fully intended scope of the appended claims.

The invention claimed is:

1. A color changing coated and or laminated intermediate adapted for use for tamper evident color changing or masking substrates to reveal information upon the separation of layers of the intermediate, comprising: (i) a colored translucent layer having an upper surface and a lower surface; (ii) a second translucent colored layer having an upper surface and a lower surface, the upper surface being intimately and removably adhered to the lower surface of said colored translucent layer (i) to form a combined translucent color that is the product of the combination of the colors of the two layers or is the dominant color of the two layers; and (iii) a reversible separable interface at the interface of the two colored layers that when separated produces a color change back to the original colors of the separate colored translucent layers said intermediate having a pressure sensitive adhesive layer and removable backing layer to affix the intermediate to an article; or a thermally activated adhesive layer to affix the intermediate to an article and indicia on said article printed in a color and shade the same as the color of the combined layers so it is masked by the combined colored translucent layers when they are affixed over the indicia on the article, such indicia only visible when the translucent colored layers are separated.

2. An intermediate as defined in claim 1 provided with clear or translucent protective coating(s) over indicia on the exposed surface of the intermediate for scuff and rub resistance or to change or equalize the gloss level of the surface of the intermediate to aid in masking the presence of the indicia in the reflection of light.

3. An intermediate as defined in claim 1, provided with print receptive coatings applied to the exposed (non adhesive) surface of the intermediate that can be customized by a converter or printer including print receptive coatings for flexographic, gravure or lithographic inks to help improve ink adhesion and/or receive images from ink jet, thermal transfer, laser, dye diffusion and other types of electronic imaging printers.

4. An intermediate as defined in claim 1 provided with a removable masking layer in combination with the intermediate of the invention said layer having been applied over part or the entire intermediate surface.

5. An intermediate as defined in claim 1 wherein said removable masking layer comprises a scratch off coating.

6. An intermediate as defined in claim 1 wherein at least one of the separable layers is signature compatible.

7. An intermediate as defined in claim 6 wherein at least one of the said signature compatible layers is treated with a formulation comprising finely divided clay or silica.

8. An intermediate as defined in claim 1 wherein at least one of the separable layers is signature compatible.

9. An intermediate as defined in claim 8 wherein at least one of the said signature compatible layers is treated with a formulation comprising finely divided clay or silica.

10. A color changing coated and or laminated intermediate adapted for use for tamper evident color changing or masking substrates to reveal information upon the separation of layers of the intermediate, comprising: (i) a colored translucent layer having an upper surface and a lower surface; (ii) a second translucent colored layer having an upper surface and a lower surface, the upper surface being intimately and removably adhered to the lower surface of said colored translucent layer (i) to form a combined translucent color that is the product of the combination of the colors of the two layers or is the dominant color of the two layers; and (iii) a reversible separable interface at the interface of the two colored layers that when separated produces a color change back to the original colors of the separate colored translucent layers said intermediate having a pressure sensitive adhesive layer and removable backing layer to affix the intermediate to an article; or a thermally activated adhesive layer to affix the intermediate to an article including indicia on the exposed surface of the intermediate printed in a color and shade the same as the color of the combined layers so it is masked by the combined colored translucent layers, such indicia only visible when the translucent colored layers are separated.

* * * * *